(12) United States Patent
Ozaki et al.

(10) Patent No.: US 9,190,674 B2
(45) Date of Patent: Nov. 17, 2015

(54) FUEL CELL AND FUEL CELL SYSTEM

(75) Inventors: Toru Ozaki, Chiba (JP); Noboru Ishisone, Chiba (JP); Tsuneaki Tamachi, Chiba (JP); Norimasa Yanase, Chiba (JP); Takafumi Sarata, Chiba (JP); Kazutaka Yuzurihara, Chiba (JP); Fumiharu Iwasaki, Chiba (JP)

(73) Assignee: SEIKO INSTRUMENTS INC. (JP)

( * ) Notice: Subject to any disclaimer, the term of this patent is extended or adjusted under 35 U.S.C. 154(b) by 532 days.

(21) Appl. No.: 12/998,503

(22) PCT Filed: Oct. 19, 2009

(86) PCT No.: PCT/JP2009/068032
§ 371 (c)(1),
(2), (4) Date: Apr. 27, 2011

(87) PCT Pub. No.: WO2010/050377
PCT Pub. Date: May 6, 2010

(65) Prior Publication Data
US 2011/0217625 A1 Sep. 8, 2011

(30) Foreign Application Priority Data
Oct. 28, 2008 (JP) .................................. 2008-277449

(51) Int. Cl.
*H01M 8/04* (2006.01)
*H01M 8/02* (2006.01)
(Continued)

(52) U.S. Cl.
CPC ........ *H01M 8/04089* (2013.01); *H01M 8/0247* (2013.01); *H01M 8/04201* (2013.01); *F17C 11/00* (2013.01); *H01M 8/0258* (2013.01);
(Continued)

(58) Field of Classification Search
None
See application file for complete search history.

(56) References Cited

U.S. PATENT DOCUMENTS

2001/0049037 A1* 12/2001 St-Pierre et al. ................. 429/17
2003/0219639 A1* 11/2003 Edlund .......................... 429/32
(Continued)

FOREIGN PATENT DOCUMENTS

| JP | 2004193107 | 7/2004 |
| JP | 2004193125 | 7/2004 |

(Continued)

OTHER PUBLICATIONS

Mihara et al., JP2005-038738, Gas diffusion layer electrode base material, its manufacturing method, and polymer electrolyte fuel cell, English Abstract, Feb. 10, 2005.*
(Continued)

*Primary Examiner* — Patrick Ryan
*Assistant Examiner* — Jose Colucci Rios
(74) *Attorney, Agent, or Firm* — Adams & Wilks

(57) ABSTRACT

A fuel cell has a membrane electrode assembly and a supply member for supplying an anode fluid to the membrane electrode assembly. The membrane electrode assembly has an electrolyte membrane and an anode catalyst. The supply member has at least one anode fluid flow path for supplying the anode fluid toward the membrane electrode assembly. A gas diffusion layer is provided between the supply member and the membrane electrode assembly. An opening of the at least one anode fluid flow path on a discharge side thereof for the anode fluid is disposed in contact with a side of the gas diffusion layer facing the supply member. The side of the gas diffusion layer includes a region that stores a gas pushed by the supply of the anode fluid.

23 Claims, 11 Drawing Sheets

(51) Int. Cl.
*H01M 8/10* (2006.01)
*F17C 11/00* (2006.01)

(52) U.S. Cl.
CPC ........ *H01M2008/1095* (2013.01); *Y02E 60/50* (2013.01); *Y02E 60/521* (2013.01)

(56) References Cited

U.S. PATENT DOCUMENTS

| | | | |
|---|---|---|---|
| 2005/0042454 A1* | 2/2005 | Zhao et al. | 428/408 |
| 2006/0192412 A1* | 8/2006 | Schonauer et al. | 296/213 |
| 2006/0292412 A1* | 12/2006 | Faghri et al. | 429/26 |
| 2008/0206615 A1* | 8/2008 | Nicotera et al. | 429/30 |
| 2009/0098435 A1* | 4/2009 | Shibata et al. | 429/32 |
| 2009/0148726 A1* | 6/2009 | Ji et al. | 429/12 |

FOREIGN PATENT DOCUMENTS

| | | |
|---|---|---|
| JP | 2005038738 | 2/2005 |
| JP | 2005216581 | 8/2005 |
| JP | 2007242443 | 9/2007 |
| JP | 2008176960 | 7/2008 |
| WO | 2007083838 | 7/2007 |

OTHER PUBLICATIONS

Ishikawa, JP2007-242443, Fuel cell power generation, English Abstract, Sep. 20, 2007.*

* cited by examiner

FUEL CELL AND FUEL CELL SYSTEM

CROSS-REFERENCE TO RELATED APPLICATIONS

This application is a U.S. national stage application of International Application No. PCT/JP2009/068032 filed Oct. 19, 2009, claiming a priority date of Oct. 28, 2008, and published in a non-English language.

BACKGROUND OF THE INVENTION

1. Technical Field

This invention relates to a fuel cell comprising an electrolyte membrane and an anode catalyst and a cathode catalyst provided on both sides of the electrolyte membrane, and to a fuel cell system including the fuel cell.

2. Background Art

A fuel cell has a membrane electrode assembly (hereinafter referred to as MEA) provided with an electrolyte membrane, and an anode catalyst and a cathode catalyst provided on both sides of the electrolyte membrane. The fuel cell includes an anode member (anode) provided with an anode fluid flow path for supplying an anode fluid to the anode catalyst of the MEA via a gas diffusion layer, and a cathode member (cathode) provided with a cathode fluid flow path for supplying a cathode fluid to the cathode catalyst of the MEA.

With such a fuel cell, air in the atmosphere (particularly, nitrogen which is an inert gas) mixes into the anode side as an impure gas via the electrolyte membrane when power generation is stopped. The problem arises here that even when an operation is started in this state and a hydrogen-rich anode fluid is introduced, hydrogen is not replaced immediately, and a sufficient electrical output (or amount of power generation) cannot be obtained. When the fuel cell is allowed to stand for a long term, in particular, the problem occurs that the partial pressure of the impure gas mixed into the anode rises, decreasing the amount of power generation.

To deal with these problems, a technology for purging the impure gas, which has been accumulated in the anode, with the hydrogen-rich anode fluid before start of operation has been proposed (see, for example, Patent Document 1).

Concretely, Patent Document 1 involves a purge valve for purging an impure gas accumulated in an anode with a hydrogen-rich anode fluid, and an exhaust gas treatment device for diluting an exhaust gas, which is discharged through the purge valve and contains hydrogen, and discharging the diluted gas to the outside.

According to this constitution of Patent Document 1, the impure gas on the anode side can be replaced by the hydrogen-rich anode fluid. Thus, a decrease in the amount of power generation can be prevented.

PRIOR ART DOCUMENT

Patent Document

[Patent Document 1] JP-A-2004-193107

The constitution of Patent Document 1, however, needs the purge valve and the exhaust gas treatment device, and is confronted with the problem that it results in the upsizing of equipment and a cost increase.

With the constitution of Patent Document 1, moreover, the impure gas can be excluded from the anode by purging at the starting of the equipment. However, the impure gas passes into the anode through the electrolyte membrane even during power generation. Thus, during long-term power generation, the opening and closing of the purge valve must be controlled, with the status of power generation being monitored, posing the problem of complicated control.

SUMMARY OF THE INVENTION

The present invention has been accomplished in the light of the above-described circumstances. It is an object of the present invention to provide a downsized fuel cell and a downsized fuel cell system which can prevent a power generation failure due to the impure gas and can perform power generation continuously for a long term.

A first aspect of the present invention for solving the above problems is a fuel cell, comprising: a membrane electrode assembly equipped with an electrolyte membrane and an anode catalyst; a supply member for supplying an anode fluid to the membrane electrode assembly; and a gas diffusion layer provided between the supply member and the membrane electrode assembly, and wherein the supply member is provided with an anode fluid flow path for supplying the anode fluid toward the membrane electrode assembly, an opening of the anode fluid flow path on a discharge side thereof for the anode fluid is provided in contact with the gas diffusion layer, and a region for storing a gas pushed away by supply of the anode fluid is provided on a side of the gas diffusion layer facing the supply member.

According to the first aspect mentioned above, the anode fluid is supplied toward the membrane electrode assembly by the anode fluid flow path. By so doing, the impure gas present on the surface of the anode catalyst can be pushed away by the anode fluid, and the anode fluid can be supplied uniformly throughout the surface of the anode catalyst. By this means, the amount of power generation, particularly, the initial voltage, can be rendered high, and power generation can be maintained for a long term.

A second aspect of the present invention is the fuel cell according to the first aspect, wherein the supply member is provided with a protruding portion which protrudes toward the gas diffusion layer and within which the anode fluid flow path is provided, and a leading end surface of the protruding portion contacts the gas diffusion layer.

According to the second aspect mentioned above, by providing the protruding portion, the space is defined between the gas diffusion layer and the supply member in the region other than the protruding portion. Thus, the impure gas is easily pushed away into this space. Moreover, a large amount of the impure gas can be stored within the space, so that power generation can be continued for an even longer term.

A third aspect of the present invention is the fuel cell according to the second aspect, wherein the protruding portion has a tapered shape pointed toward the membrane electrode assembly.

According to the third aspect mentioned above, the protruding portion is pointed, whereby a large space can be defined in the region other than the protruding portion. Thus, an even larger amount of the impure gas can be stored within the space.

A fourth aspect of the present invention is the fuel cell according to any one of the first to third aspects, wherein the anode fluid flow path has a tapered shape pointed toward the membrane electrode assembly.

According to the fourth aspect mentioned above, the anode fluid flow path is pointed, whereby the flow velocity of the anode fluid jetted from the anode fluid flow path is increased, and the impure gas present on the surface of the anode catalyst can be pushed away by the anode fluid even more efficiently.

A fifth aspect of the present invention is the fuel cell according to any one of the first to fourth aspects, wherein a plurality of the anode fluid flow paths are provided in the single supply member.

According to the fifth aspect mentioned above, the anode fluid can be supplied uniformly to the surface of the anode catalyst having a relatively large area by the plurality of anode fluid flow paths.

A sixth aspect of the present invention is the fuel cell according to any one of the first to fourth aspects, wherein a plurality of the anode fluid flow paths are provided in the single supply member, there are provided a chamber communicating with the plurality of anode fluid flow paths on a side opposite to the gas diffusion layer, and an anode fluid introduction port for supplying the anode fluid to the chamber, the supply member is provided with a protruding portion which protrudes toward the gas diffusion layer and within which the anode fluid flow path is provided, the protruding portion having a first protruding portion and a second protruding portion, the second protruding portion is at a longer distance from the anode fluid introduction port than a distance from the anode fluid introduction port to the first protruding portion, and an amount of protrusion of the first protruding portion is larger than an amount of protrusion of the second protruding portion, and a leading end surface of the protruding portion contacts the gas diffusion layer.

According to the sixth aspect mentioned above, the pressures of the anode fluid jetted from the plurality of anode fluid flow paths are uniformized, so that the anode fluid can be supplied to the surface of the anode catalyst relatively uniformly.

A seventh aspect of the present invention is the fuel cell according to any one of the first to sixth aspects, further comprising a chamber communicating with a plurality of the anode fluid flow paths on a side opposite to the gas diffusion layer, and an anode fluid introduction port for supplying the anode fluid to the chamber, and wherein a pressure loss in the anode fluid flow path is greater than a pressure loss in an area from the anode fluid introduction port to each of the anode fluid flow paths.

According to the seventh aspect mentioned above, the anode fluid can be vigorously ejected from the anode fluid flow path to blow off the impure gas present on the surface of the anode catalyst.

An eighth aspect of the present invention is the fuel cell according to any one of the fifth to seventh aspects, further comprising a chamber communicating with the plurality of anode fluid flow paths on a side opposite to the gas diffusion layer, and an anode fluid introduction port for supplying the anode fluid to the chamber, and wherein the plurality of anode fluid flow paths include a first of the anode fluid flow paths, and a second of the anode fluid flow paths whose distance from the anode fluid introduction port is longer than a distance from the anode fluid introduction port to the first anode fluid flow path, and a pressure loss in the first anode fluid flow path is greater than a pressure loss in the second anode fluid flow path.

According to the eighth aspect mentioned above, the pressures of the anode fluid jetted from the plurality of anode fluid flow paths are uniformized, so that the anode fluid can be supplied uniformly to the surface of the anode catalyst.

A ninth aspect of the present invention is the fuel cell according to any one of the fifth to eighth aspects, further comprising a chamber communicating with the plurality of anode fluid flow paths on a side opposite to the gas diffusion layer, and an anode fluid introduction port for supplying the anode fluid to the chamber, and wherein the plurality of anode fluid flow paths include a first of the anode fluid flow paths, and a second of the anode fluid flow paths whose distance from the anode fluid introduction port is longer than a distance from the anode fluid introduction port to the first anode fluid flow path, and a pressure loss in a first guide path within the chamber in an area from the anode fluid introduction port to the first anode fluid flow path is greater than a pressure loss in a second guide path within the chamber in an area from the anode fluid introduction port to the second anode fluid flow path.

According to the ninth aspect mentioned above, the pressures of the anode fluid jetted from the plurality of anode fluid flow paths are uniformized, so that the anode fluid can be supplied uniformly to the surface of the anode catalyst.

A tenth aspect of the present invention is the fuel cell according to the eighth aspect, wherein spacings between the adjacent anode fluid flow paths of the plurality of anode fluid flow paths of the supply member gradually decrease from the anode fluid flow paths at shorter distances from the anode fluid introduction port toward the anode fluid flow paths at longer distances from the anode fluid introduction port.

By varying the pressure losses in the anode fluid flow paths, variations occur in the flow velocity of the anode fluid, and the range of spread of the anode fluid differs according to the distribution of the flow velocity. According to the tenth aspect mentioned above, however, the spacings between the adjacent anode fluid flow paths are varied, whereby the unevenness in the in-plane distribution of the anode fluid can be reduced.

An eleventh aspect of the present invention is the fuel cell according to any one of the first to tenth aspects, further comprising removal means for removing the gas from the region storing the gas pushed away by the anode fluid.

According to the eleventh aspect mentioned above, the gas, such as an impure gas, pushed away within the space charged with the anode fluid can be removed from the space charged with the anode fluid. Thus, the amount of power generation can be increased further, and power generation can be maintained for a long term.

A twelfth aspect of the present invention is the fuel cell according to the eleventh aspect, wherein the removal means is a lead-out path which communicates with the region storing the gas pushed away by the supply of the anode fluid to discharge the gas as a buffer.

According to the twelfth aspect mentioned above, the gas such as an impure gas can be discharged via the lead-out path as a buffer. Thus, the amount of power generation can be increased further, and power generation can be maintained for a long term.

A thirteenth aspect of the present invention is the fuel cell according to the twelfth aspect, wherein the lead-out path is provided with a check valve which permits a flow of the gas from the region storing the gas to the buffer and restrains a flow of the gas in a reverse direction.

According to the thirteenth aspect mentioned above, the gas discharged to the buffer does not return because of the check valve. Thus, the amount of power generation can be increased further, and power generation can be maintained for a long term.

A fourteenth aspect of the present invention is the fuel cell according to the eleventh aspect, wherein the removal means is an adsorbent provided in the region storing the gas pushed away by the anode fluid.

According to the fourteenth aspect mentioned above, the gas, such as an impure gas, is selectively adsorbed to the adsorbent, and can be removed thereby. Thus, the amount of power generation can be increased further, and power generation can be maintained for a long term.

A fifteenth aspect of the present invention is a fuel cell system, comprising: the fuel cell according to any one of the first to fourteenth aspects; and fuel supply means for supplying the anode fluid to the fuel cell.

According to the fifteenth aspect mentioned above, a fuel cell system can be realized which prevents a power generation failure due to an impure gas, which can perform power generation continuously for a long term, and which has been downsized.

With the present invention, the anode fluid is flowed toward the membrane electrode assembly by the anode fluid flow path directly via the gas diffusion layer. By so doing, the impure gas on the surface of the anode catalyst is pushed away, and the anode fluid can be supplied throughout the surface of the anode catalyst. Thus, there is no need to provide a complicated mechanism such as a purge valve or a gas treatment device. Also, a power generation failure, or a decrease in the amount of power generation, due to the impure gas is prevented, the amount of power generation is increased, and long-term power generation can be maintained. Moreover, it suffices to provide the anode fluid flow path for flowing the anode fluid toward the membrane electrode assembly. Thus, the provision of a purge valve, or a procedure such as complicated opening and closing of the purge valve becomes unnecessary, downsizing can be achieved, and the cost can be reduced.

DETAILED DESCRIPTION OF THE INVENTION

Hereinbelow, the present invention will be described in detail based on its embodiments.

Embodiment 1

Figure 1:
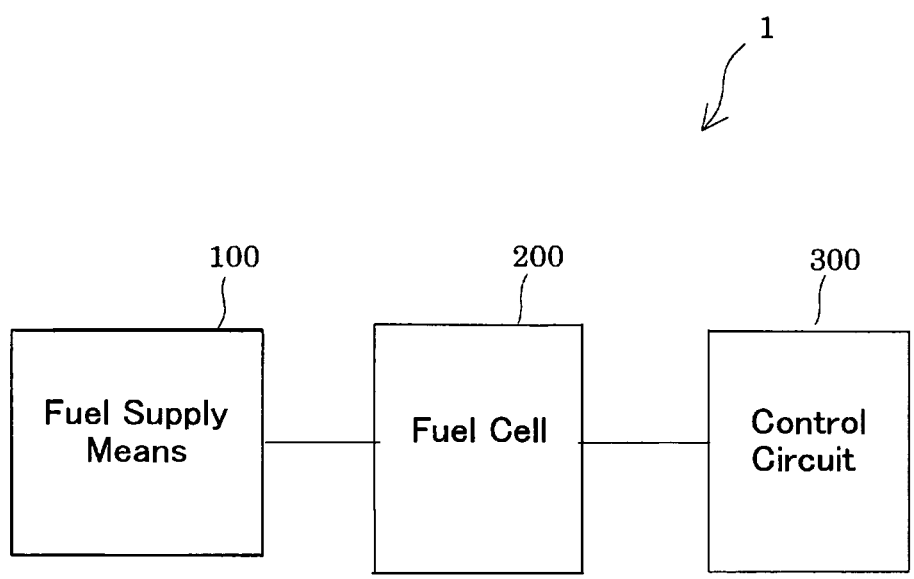
FIG. 1 is a block diagram showing the schematic configuration of a fuel cell system according to Embodiment 1 of the present invention.

FIG. 1 is a view showing the schematic configuration of a fuel cell system according to the present invention.

As shown in FIG. 1, a fuel cell system 1 of the present embodiment comprises a fuel supply means 100, a fuel cell 200, and a control circuit 300.

The fuel supply means 100 supplies a fuel as an anode fluid to the fuel cell 200. Hydrogen is optimal as the fuel, and a hydrogen absorbing or storage alloy, a cylinder enclosing hydrogen, etc. are named as the fuel supply means 100. The fuel supply means 100 may be one for generating hydrogen, and an example thereof is of a configuration in which a hydrogen generating substance and a hydrogen generation accelerator are mixed to produce hydrogen. For example, sodium borohydride can be used as the hydrogen generating substance, and an aqueous solution of malic acid can be used as the hydrogen generation accelerator. Moreover, a solution of methanol may be supplied as the fuel.

The control circuit 300 is connected to the fuel cell 200, and driven by a voltage supplied by the fuel cell 200.

Figure 2:
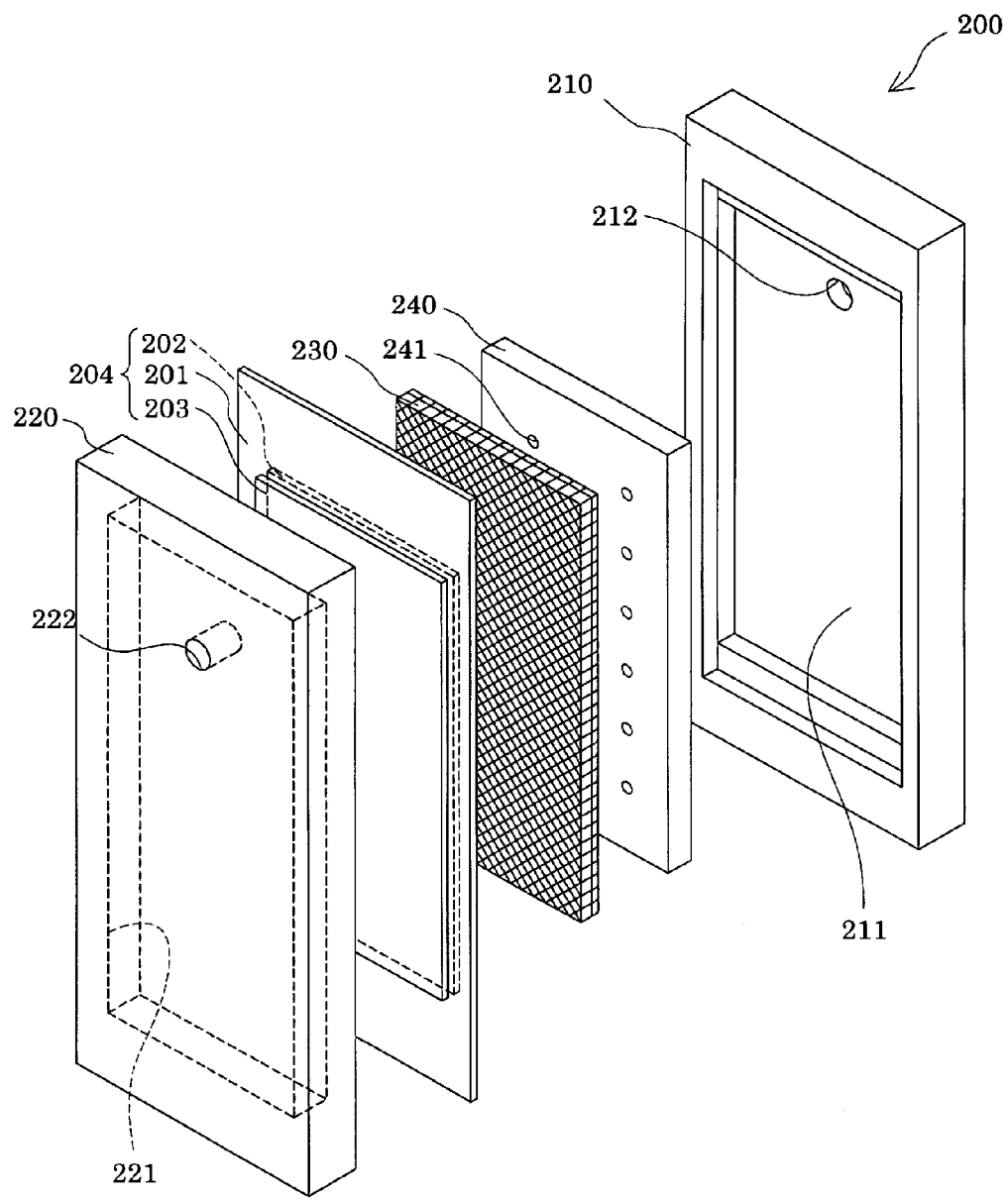
FIG. 2 is an exploded perspective view showing the fuel cell according to Embodiment 1 of the present invention.
Figure 3:
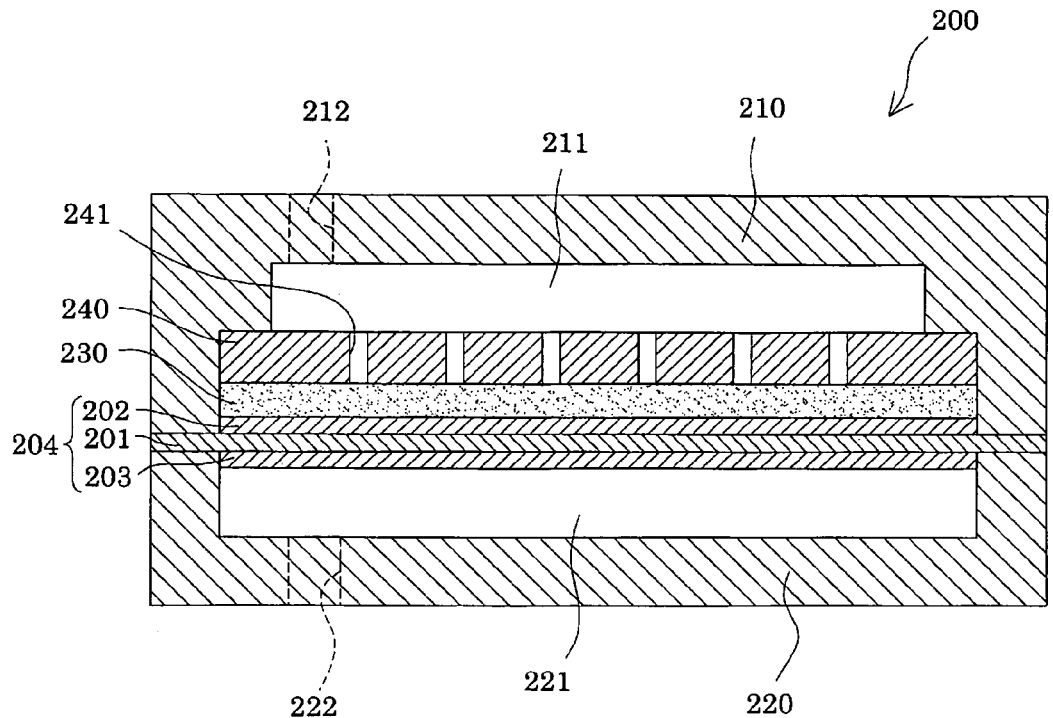
FIG. 3 is a sectional view showing the fuel cell according to Embodiment 1 of the present invention.
Figure 4:
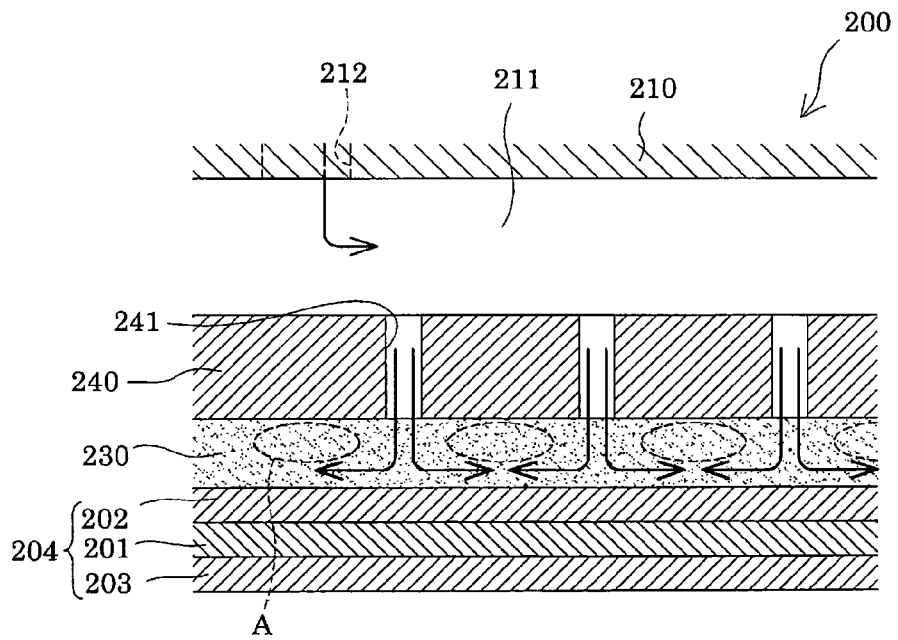
FIG. 4 is a sectional view of essential parts showing the supply state of an anode fluid in the fuel cell according to Embodiment 1 of the present invention.

The fuel cell 200 will be described in detail by reference to FIGS. 2 to 4. FIG. 2 is an exploded perspective view showing the schematic configuration of the fuel cell. FIG. 3 is a sectional view of the fuel cell. FIG. 4 is a sectional view of essential parts showing the supply state of the anode fluid in the fuel cell.

As shown in FIGS. 2 and 3, the fuel cell 200 has a membrane electrode assembly 204 (hereinafter referred to as MEA) composed of a solid polymer electrolyte membrane 201 as an electrolyte membrane, and an anode catalyst 202 and a cathode catalyst 203 provided on both sides of the solid polymer electrolyte membrane 201.

An anode member 210 and a cathode member 220 are provided on the respective surfaces of the MEA 204. That is, the MEA 204 is sandwiched between the anode member 210 and the cathode member 220.

The cathode member 220 is composed of a plate-shaped member provided on a side of the MEA 204 where the cathode catalyst 203 is located. The cathode member 220 is provided with a cathode fluid flow path 221 for supplying an oxidizing agent (air containing oxygen), as a cathode fluid, to the cathode catalyst 203. That is, the cathode member 220 functions as a supply member for supplying the cathode fluid to the cathode catalyst 203. The cathode fluid flow path 221, in the present embodiment, has a concave shape opening at a side of the cathode member 220 facing the cathode catalyst 203. In the bottom surface of the cathode fluid flow path 221, a cathode fluid introduction port 222 is provided for supplying air into the cathode fluid flow path 221.

The anode member 210 is composed of a plate-shaped member provided on a side of the MEA 204 where the anode catalyst 202 is located. The anode member 210 has a chamber 211 of a concave shape opening toward the anode catalyst 202, and an anode fluid introduction port 212 provided as a through-hole in the thickness direction of the bottom surface of the chamber 211.

The chamber 211 has an opening area comparable to the surface area of the anode catalyst 202. The interior of the chamber 211 is supplied with the anode fluid via the anode fluid introduction port 212 provided in the bottom surface thereof.

Between the anode member 210 and the MEA 204, there are provided a gas diffusion layer 230, and a supply member 240 for supplying the anode fluid within the chamber 211 to the gas diffusion layer 230.

The gas diffusion layer (GDL) 230 is provided between the anode member 210 and the MEA 204 to face the MEA 204, that is, to be located on the anode catalyst 202 of the MEA 204, and comprises a member having permeability which allows the anode fluid to pass therethrough. As the gas diffusion layer 230, a well-known material can be used, for example, a metal mesh or a material having a porous structure such as a carbon cloth, a carbon paper, or a carbon felt.

The supply member 240 comprises a plate-shaped member provided on a side opposite to the MEA 204 across the gas diffusion layer 230. The supply member 240 is provided to have a surface in contact with the gas diffusion layer 230. The other surface of the supply member 240 on a side opposite to the surface contacting the gas diffusion layer 230 seals one surface of the chamber 211.

The supply member 240 is provided with an anode fluid flow path 241 to penetrate the supply member 240 in its thickness direction, thereby bringing the chamber 211 and the gas diffusion layer 230 into communication. That is, the anode fluid flow path 241 has one end opening into the chamber 211 and the other end opening to the gas diffusion layer 230, thereby establishing communication between them. As described above, the one surface of the supply member 240 is brought into contact with the gas diffusion layer 230, whereby an opening of the anode fluid flow path 241 on the discharge side for the anode fluid (i.e., an opening on the side facing the gas diffusion layer 230) is provided in contact with the gas diffusion layer 230.

In the present embodiment, there are provided two rows of the anode fluid flow paths 241, each row including a plurality of (six) the anode fluid flow paths 241 arranged with predetermined spacing, so that 12 of the anode fluid flow paths 241 are provided. The anode fluid flow path 241 is provided such that a pressure loss in the anode fluid flow path 241 is greater than a pressure loss occurring in a region ranging from the anode fluid introduction port 212 to each anode fluid flow path 241. Concretely, in the present embodiment, the chamber 211 is provided to be of such a size as to be in common communication with the plurality of anode fluid flow paths 241 (namely, the opening area of the chamber 211 is comparable to the surface area of the anode catalyst 202), and the opening areas (cross-sectional areas) of the anode fluid flow paths 241 are much smaller than the opening area of the chamber 211. Consequently, the pressure loss in the anode fluid flow path 241 is rendered greater than the pressure loss occurring in the region ranging from the anode fluid introduction port 212 of the chamber 211 to each anode fluid flow path 241. By so increasing the pressure loss in the anode fluid flow path 241, the anode fluid supplied into the chamber 211 can be supplied as jets at a desired pressure toward the surface of the anode catalyst 202 by the anode fluid flow path 241, although the details of this action will be described later. The anode fluid flow path 241 may be of a shape pointed toward the anode catalyst 202. Of course, the anode fluid flow path 241 is not limited in size (opening area), number or position, and the size, number and position may be determined, as appropriate, based on the pressure of the anode fluid within the chamber 211, the partial pressure of an impure gas on the surface side of the anode catalyst 202, the flow velocity of the anode fluid supplied to the anode catalyst 202 to push away the impure gas, and so on. If the anode fluid flow path 241 is shaped to be pointed or tapered toward the anode catalyst 202, as mentioned above, the flow velocity of the anode fluid jetted from the anode fluid flow path 241 can be increased. By so doing, the anode fluid can be easily supplied to the surface of the anode catalyst 202; that is, the impure gas existent on the surface of the anode catalyst 202 can be easily pushed away, although the details will be offered later.

The anode fluid flow path 241 of the supply member 240 penetrates the supply member 240 in its thickness direction, and is thereby provided along a direction intersecting the surface of the anode catalyst 202. By this measure, the anode fluid supplied into the chamber 211 can be passed through the gas diffusion layer 230 by way of the anode fluid flow path 241, and supplied toward the surface of the anode catalyst 202. That is, it suffices for the anode fluid flow path 241 of the supply member 240 to be provided along the direction intersecting the surface of the anode catalyst 202. The anode fluid flow path 241 may be orthogonal to the surface of the anode catalyst 202, or may be inclined at a predetermined angle with respect to this surface.

With the above-described fuel cell 200, the cathode fluid flow path 221 is open to the atmosphere. If the fuel cell is allowed to stand for a long term, therefore, air in the atmosphere (particularly, nitrogen as an inert gas) slips, as an impure gas, into a space where the anode catalyst 202 is provided, i.e., within the gas diffusion layer 230, through the solid polymer electrolyte membrane 201. A rise in the partial pressure of the impure gas (nitrogen) causes a drop in the partial pressure of the anode fluid in the anode catalyst 202. Thus, a sufficient amount of the anode fluid for power generation cannot be supplied, so that the amount of power generation decreases.

With the fuel cell 200 of the present embodiment, however, the anode fluid is supplied by the anode fluid flow paths 241 to be blown toward the surface of the anode catalyst 202, as shown in FIG. 4. Thus, the impure gas existent on the surface of the anode catalyst 202 is pushed away, and the anode fluid can be supplied to the surface of the anode catalyst 202. That is, the anode fluid supplied by the anode fluid flow paths 241 toward the surface of the anode catalyst 202 (from the direction intersecting the surface) spreads along the surface of the anode catalyst 202 while pushing away the impure gas within the gas diffusion layer 230 filled as an atmosphere for the anode catalyst 202. On this occasion, the impure gas pushed away from the surface side of the anode catalyst 202 remains in regions A on a side of the gas diffusion layer 230 opposite to the anode catalyst 202, namely, the side facing the supply member 240.

As described above, the anode fluid is supplied toward the surface of the anode catalyst 202 by the anode fluid flow paths 241 to push away the impure gas (nitrogen) from the surface of the anode catalyst 202, whereby the efficiency of power generation or the power efficiency of the anode catalyst 202 can be increased. For example, if the anode fluid flow path 241 is not provided, namely, if the chamber 211 is provided to face the gas diffusion layer 230 directly, the anode fluid supplied from the anode fluid introduction port 212 is supplied along the surface of the anode catalyst 202. If the anode fluid is supplied in the planar direction of the surface of the anode catalyst 202 in this manner, power generation takes place only on the side where the anode fluid is supplied. In a region extending long from the side where the anode fluid is supplied, on the other hand, the partial pressure of the impure gas becomes so high that power generation substantially does not occur. That is, when the anode fluid is supplied along the surface of the anode catalyst 202, the entire surface of the anode catalyst 202 cannot be used efficiently, so that the amount of power generation decreases. By contrast, the anode fluid flow path 241 supplying the anode fluid in such a manner as to blow it against the surface of the anode catalyst 202 is provided as in the present embodiment, whereby the anode fluid can be supplied uniformly over the entire surface of the anode catalyst 202. Thus, power generation can be performed with the use of the entire surface of the anode catalyst 202, and the amount of power generation, particularly, the initial voltage, can be rendered high.

With the fuel cell 200, moreover, the mixing of the impure gas, such as nitrogen in the air, into the anode catalyst 202 (gas diffusion layer 230) occurs during power generation as well. Thus, long-term power generation cannot be maintained, if the anode fluid flow path 241 is not provided. In the present embodiment, on the other hand, the anode fluid is supplied toward the surface of the anode catalyst 202 by the anode fluid flow paths 241. By so doing, the anode fluid can continue to be supplied to the surface of the anode catalyst 202, with the impure gas present on the surface of the anode catalyst 202 being constantly pushed away, so that long-term power generation can be maintained.

In the present embodiment, the openings of the anode fluid flow paths 241 are brought into direct contact with the surface of the gas diffusion layer 230 facing the supply member 240, whereby a constantly high concentration of the anode fluid can be supplied to the anode catalyst 202. That is, if a space exists between the openings of the anode fluid flow paths 241 and the gas diffusion layer 230, the impure gas pushed away by the anode fluid fills this space, with the result that the anode fluid supplied from the anode fluid flow paths 241 and the impure gas filling the space are both supplied to the anode catalyst 202. On the other hand, the openings of the anode fluid flow paths 241 are brought into direct contact with the gas diffusion layer 230 to flow the anode fluid directly into the gas diffusion layer 230. This makes it difficult for the impure gas to be supplied to the anode catalyst 202, and enables a high concentration of the anode fluid to be supplied to the anode catalyst 202. By supplying a relatively high concentration of the anode fluid to the anode catalyst 202 in this manner, the effect that a decrease in the power efficiency (amount of power generation) can be curtailed is exhibited.

Embodiment 2

Figure 5:
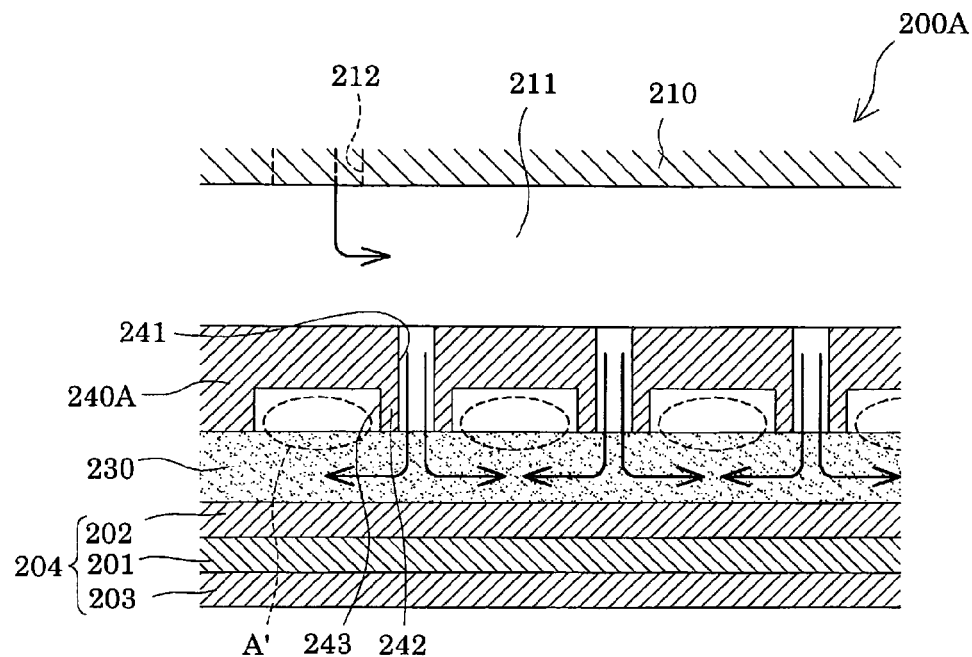
FIG. 5 is a sectional view of essential parts of a fuel cell according to Embodiment 2 of the present invention.

FIG. 5 is a sectional view of essential parts of a fuel cell according to Embodiment 2 of the present invention. The same members as those in the aforementioned Embodiment 1 will be assigned the same numerals as in the Embodiment 1, and duplicate explanations will be omitted.

As shown in FIG. 5, a fuel cell 200A of Embodiment 2 has an MEA 204, an anode member 210, a cathode member (not shown), a gas diffusion layer 230, and a supply member 240A.

A surface of the supply member 240A facing the gas diffusion layer 230 is provided with protruding portions 242 which protrude toward the gas diffusion layer 230 and inside each of which an anode fluid flow path 241 is provided. That is, the protruding portion 242 is provided in a cylindrical nozzle-like form within which the anode fluid flow path 241 is provided. The shape of the protruding portion 242 is not limited to the cylindrical form, but may be a prismatic shape, or a tapered shape which is pointed toward the gas diffusion layer 230. For example, the protruding portion 242 is formed in a tapered shape pointed toward the gas diffusion layer 230, whereby the volume of the space between the adjacent protruding portions can be rendered larger than that of the space between the adjacent cylindrical protruding portions 242, and further the amount of the impure gas storable in this space is increased, thereby making it possible to maintain long-term power generation. Details in this connection will be described later.

The protruding leading end surface of the protruding portion 242 contacts the surface of the gas diffusion layer 230, and a space 243 is defined between the supply member 240A and the gas diffusion layer 230 in a region of the supply member 240A other than the protruding portion 242.

With the fuel cell 200A described above, the anode fluid is supplied toward the surface of the anode catalyst 202 by the anode fluid flow paths 241, as in the aforementioned Embodiment 1. Thus, the impure gas such as nitrogen is pushed away, so that the amount of initial power generation can be increased, and power generation can be maintained for a long term. In the present embodiment, moreover, the space 243 is defined between the gas diffusion layer 230 and the supply member 240A in a region of the supply member 240A other than the protruding portion 242. By this configuration, the impure gas such as nitrogen which has been expelled from the surface of the anode catalyst 202 can be stored in a region A' including this space 243. Thus, the impure gas on the surface side of the anode catalyst 202 is easily pushed away toward the region A'. Furthermore, the impure gas pushed away can be stored in the relatively wide region A', so that power generation of an even longer duration can be maintained.

Figure 6:
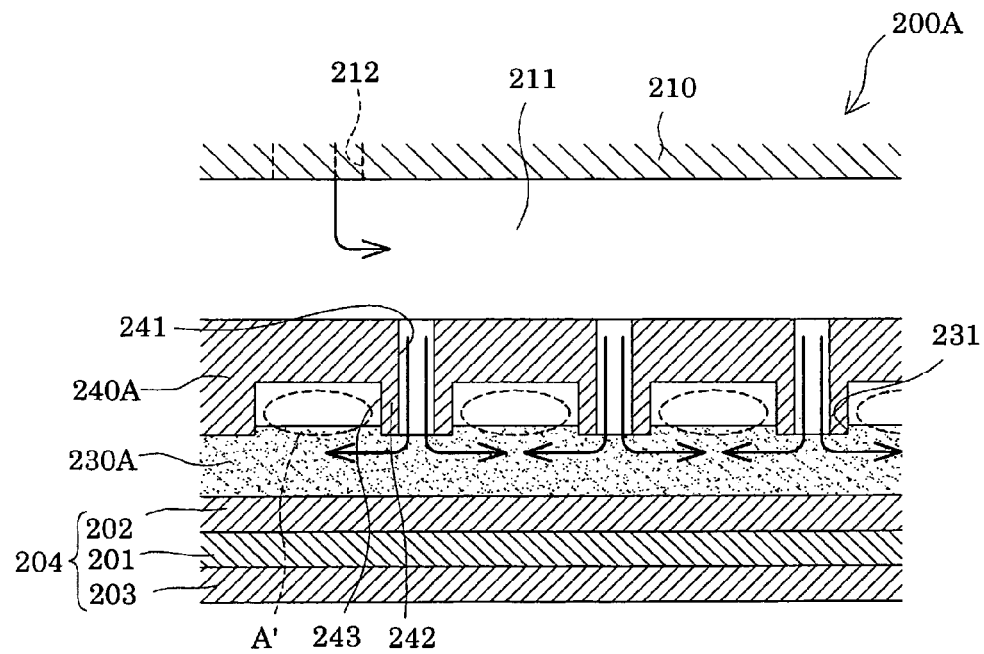
FIG. 6 is a sectional view of essential parts of a modification of the fuel cell according to Embodiment 2 of the present invention.

In the present embodiment, the leading end surface of the protruding portion 242 is brought into contact with the surface of the gas diffusion layer 230. However, this is not limitative and, for example, a leading end part of the protruding portion 242 may be embedded in the gas diffusion layer 230. Such an example is shown in FIG. 6. FIG. 6 is a sectional view of essential parts showing a modification of the fuel cell according to Embodiment 2 of the present invention.

As shown in FIG. 6, at a surface of a gas diffusion layer 230A facing the supply member 240A, a recessed portion 231 is provided at a position opposing the protruding portion 242 of the supply member 240A. The protruding portion 242 is fitted into the recessed portion 231, whereby a leading end part of the protruding portion 242 is embedded in the gas diffusion layer 230A. Such a state can also produce the same effects as those of the aforementioned Embodiment 2.

When the protruding portion 242 is embedded in the gas diffusion layer 230A, it is permissible, for example, not to define the space 243 between the supply member 240A and the gas diffusion layer 230A in the region of the supply member 240A other than the protruding portion 242. That is, it is permissible to bring all of the surface of the supply member 240A, which faces the gas diffusion layer 230A, into contact with the gas diffusion layer 230A. Even in this case, the same effects as those of the aforementioned Embodiment 1 can be exhibited.

Other Embodiments

The respective embodiments of the present invention have been described above. However, the basic features of the present invention are not limited to those mentioned above.

For example, in the aforementioned Embodiments 1 and 2, the plurality of anode fluid flow paths 241 having the same opening area are provided in the supply member 240, 240A.

Figure 7:
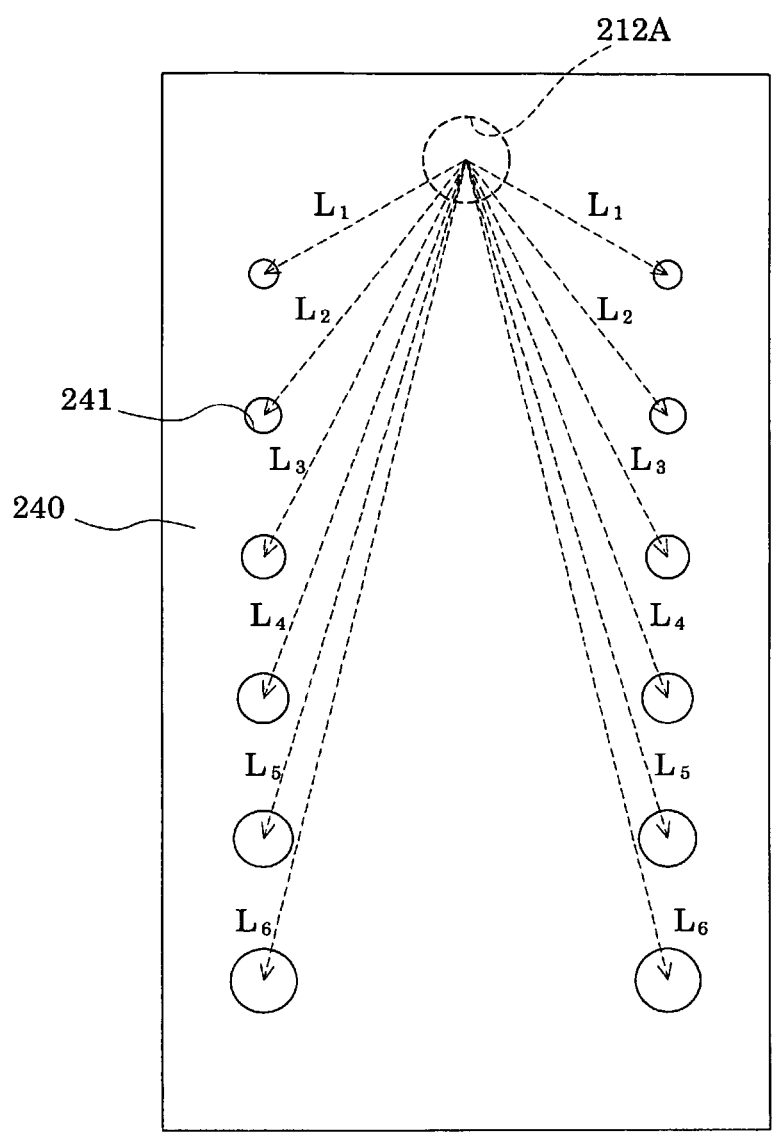
FIG. 7 is a plan view of essential parts of a fuel cell according to another embodiment of the present invention.

However, this is not limitative and, for example, the pressure loss in the anode fluid flow path 241 may be varied according to the distance from the anode fluid introduction port 212. A concrete example is shown in FIG. 7. FIG. 7 illustrates a modification of the aforementioned Embodiment 1, but the configuration of FIG. 7 can be applied to the aforementioned Embodiment 2 as well. As shown in FIG. 7, of the plurality of anode fluid flow paths 241, the anode fluid flow path 241 at a shorter distance (distance $L_1$) from the anode fluid introduction port 212 (projected part 212A obtained by projection of the anode fluid introduction port 212) is given a smaller cross-sectional area to impart a larger pressure loss, while the anode fluid flow path 241 at a longer distance (distance $L_6$) from the anode fluid introduction port 212 is given a larger cross-sectional area to impart a smaller pressure loss. That is, let the anode fluid flow path 241 at the short distance from the anode fluid introduction port 212 be the first anode fluid flow path, and let the anode fluid flow path 241 at the long distance from the anode fluid introduction port 212 be the second anode fluid flow path. In this case, the pressure loss in the first anode fluid flow path may be greater than the pressure loss in the second anode fluid flow path.

In the present embodiment, the anode fluid introduction port 212 is provided in the bottom surface of the chamber 211 and outside the rows of the juxtaposed anode fluid flow paths 241. However, the anode fluid introduction port 212 may be provided halfway through the rows of the juxtaposed anode fluid flow paths 241. The distance from the anode fluid introduction port 212 to the anode fluid flow path 241 may be actually taken on the premise that the position of the anode fluid introduction port 212 is the position of the projected part 212A obtained by projecting the anode fluid introduction port 212 onto the supply member 240.

As noted above, the opening area (cross-sectional area) of the anode fluid flow path 241 is varied based on the distance from the anode fluid introduction port 212, whereby the pressure loss in the anode fluid flow path 241 can be varied based on the distance from the anode fluid introduction port 212. That is, the fact that the opening area of the anode fluid flow path 241 is small means that the pressure loss in the anode fluid flow path 241 is great, whereas the fact that the opening area of the anode fluid flow path 241 is large means that the pressure loss in the anode fluid flow path 241 is small. The path within the chamber 211 from the anode fluid introduction port 212 to the anode fluid flow path 241 at a short distance therefrom is short. Thus, the pressure loss of the anode fluid passing along this path in the chamber 211 is small. The longer the distance over which the anode fluid passes through the chamber 211 from the anode fluid introduction port 212 until its supply to the anode fluid flow path 241, the larger its pressure loss becomes. Hence, variations in the pressure loss of the anode fluid passing within the chamber 211 can be counterbalanced by varying the pressure loss in the anode fluid flow path 241, whereby the pressure of the anode fluid supplied from each anode fluid flow path 241 can be rendered uniform. By this measure, the anode fluid can be supplied uniformly to the surface of the anode catalyst 202 to provide a uniform amount of power generation in the plane of the anode catalyst 202 and increase the efficiency of power generation (i.e., power efficiency).

Figure 8:
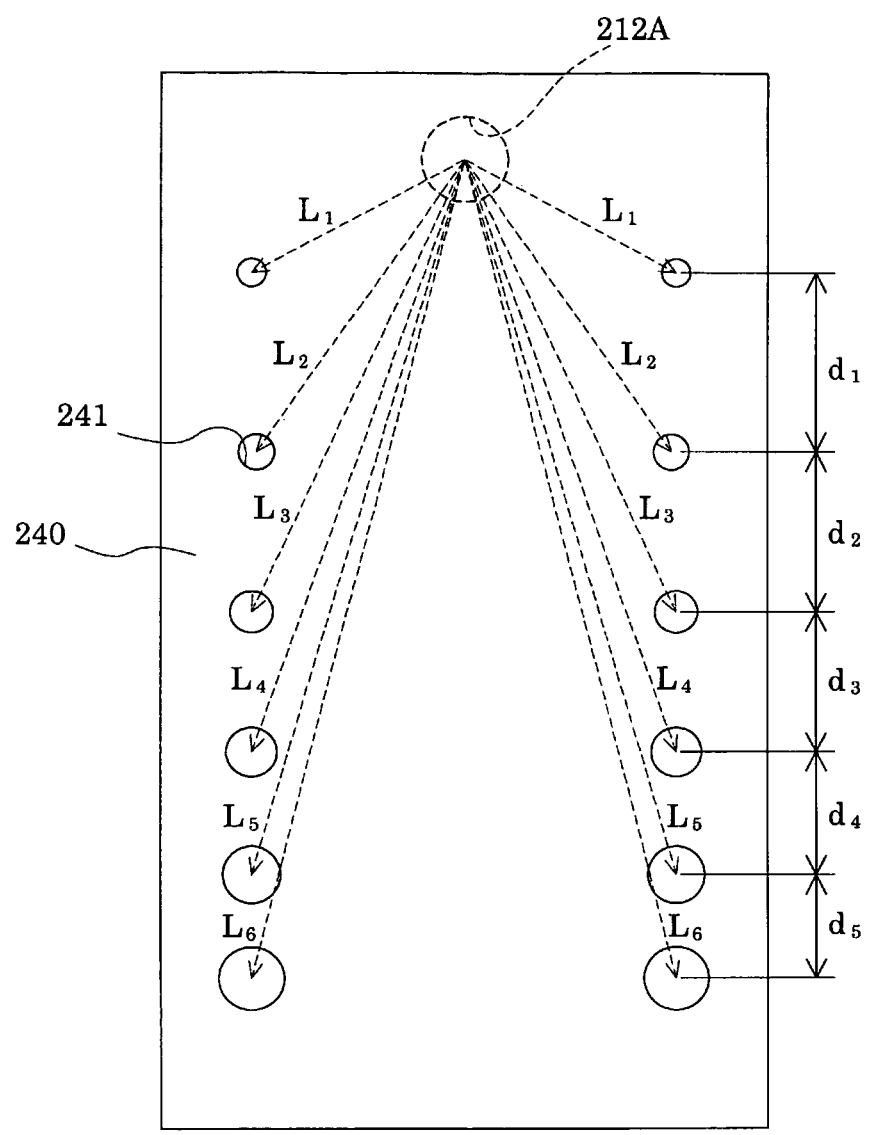
FIG. 8 is a plan view of essential parts of a fuel cell according to still another embodiment of the present invention.
Figure 9:
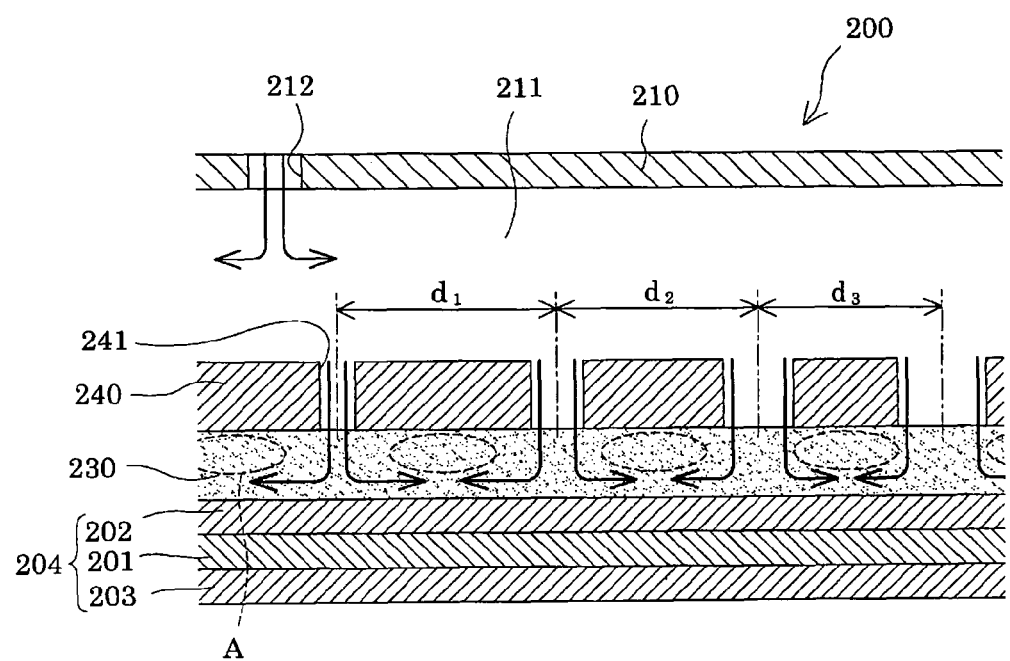
FIG. 9 is a sectional view of essential parts of the fuel cell according to the still another embodiment of the present invention.

In the example shown in FIG. 7, the flow rate of the anode fluid supplied from each anode fluid flow path 241 can be uniformized. However, as the distance from the anode fluid introduction port 212 (projected part 212A obtained by projection of the anode fluid introduction port 212) to the anode fluid flow path 241 increases, the bore of the anode fluid flow path 241 differs, so that the flow velocity of the anode fluid flowed out of the anode fluid flow path 241 changes. If the flow velocity of the anode fluid flowed out of the anode fluid flow path 241 changes in this manner, the range of spread of the anode fluid differs according to the distribution of the flow velocity. As a result, unevenness occurs in the in-plane distribution of the anode fluid, causing a possibility for a decrease in the power efficiency. Thus, in the plurality of anode fluid flow paths 241, the spacing between the adjacent anode fluid flow paths 241 is gradually decreased as the distance from the anode fluid introduction port 212 increases. By so doing, the unevenness in the in-plane distribution of the anode fluid can be curtailed. An example of such a configuration is shown in FIGS. 8 and 9. FIG. 8 is a plan view of essential parts of a fuel cell according to other embodiment of the present invention. FIG. 9 is a sectional view of essential parts of FIG. 8.

As shown in FIGS. 8 and 9, in the plurality of anode fluid flow paths 241 having the opening areas differentiated in the same manner as in FIG. 7, the spacing (e.g., spacing $d_5$) between the adjacent anode fluid flow paths 241 at a longer distance from the anode fluid introduction port 212 (projected part 212A) is rendered smaller than the spacing (e.g., spacing $d_1$) between the adjacent anode fluid flow paths 241 at a shorter distance from the anode fluid introduction port 212 (projected part 212A). Because of this configuration, the flow velocity slows from a side where the spacing between the adjacent anode fluid flow paths 241 is wide (i.e., spacing $d_1$ side) toward a side where the spacing between the adjacent anode fluid flow paths 241 is narrow (i.e., spacing $d_5$ side). Even if the range of spread of the anode fluid flowed out gradually narrows, therefore, the unevenness in the in-plane distribution of the anode fluid can be reduced. Hence, the flow rate and flow velocity of the anode fluid flowed out of the plurality of anode fluid flow paths 241 can be uniformized, whereby the impure gas (nitrogen) present on the surface of the anode catalyst 202 can be uniformly pushed away from the surface of the anode catalyst 202, and power generation can be carried out with high efficiency. In this connection, assume that the spacings between the adjacent anode fluid flow paths are all set to be identical. When, in this case, the anode fluid flow path 241 at a short distance from the anode fluid introduction port 212 is taken as the first anode fluid flow path, and the anode fluid flow path 241 at a long distance from the anode fluid introduction port 212 is taken as the second anode fluid flow path, the flow velocity of the anode fluid flowing out from the second anode fluid flow path is lower than the flow velocity of the anode fluid flowing out from the first anode fluid flow path. In this state, the range in which the anode fluid of a lower flow velocity flowing out of the second anode fluid flow path pushes away the gas and spreads on the surface of the anode catalyst 202 is narrower than the range in which the anode fluid of a higher flow velocity flowing out of the first anode fluid flow path spreads on the surface of the anode catalyst 202. Consequently, unevenness occurs in the distribution of the concentration at which the anode fluid is supplied in the plane of the surface of the anode catalyst 202, posing a possibility for the occurrence of a deficiency, such as the failure to push away the impure gas, or a decrease in the power efficiency.

The example shown in FIGS. 8 and 9 can reduce the unevenness in the in-plane distribution of the anode fluid flowed out of the plurality of anode fluid flow paths 241. Thus, the distribution of the concentration at which the anode fluid is supplied in the plane of the surface of the anode catalyst 202 is uniformized, so that the power efficiency of the anode catalyst 202 can be increased, and the amount of power generation can be maintained for a long term. In the example shown in FIGS. 8 and 9, the spacings between the centers of the adjacent anode fluid flow paths 241 are taken as the spacings $d_1$ to $d_5$ between the anode fluid flow paths. However, this is not limitative, and the spacing between the edges of the openings of the anode fluid flow paths may be taken as the spacing between the anode fluid flow paths.

Furthermore, it is permissible to form a guide path within the chamber 211, the guide path serving for communication from the anode fluid introduction port 212 to the anode fluid flow path 241, and change the pressure loss in this guide path, without changing the pressure loss in the anode fluid flow path 241. Such an example is shown in FIG. 10.

Figure 10:
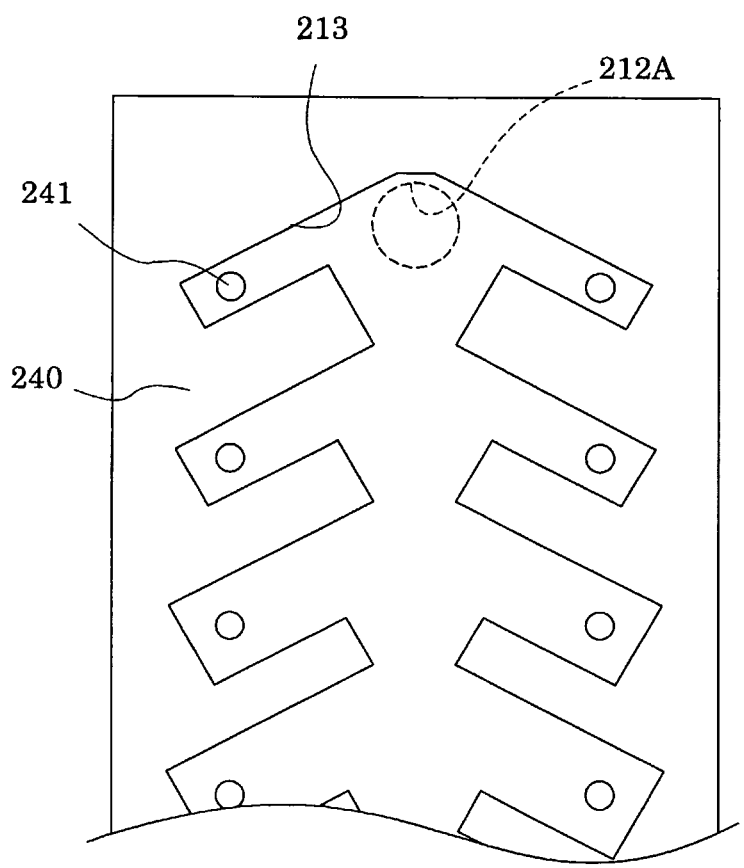
FIG. 10 is a plan view of essential parts of a fuel cell according to a further embodiment of the present invention.
Figure 11:
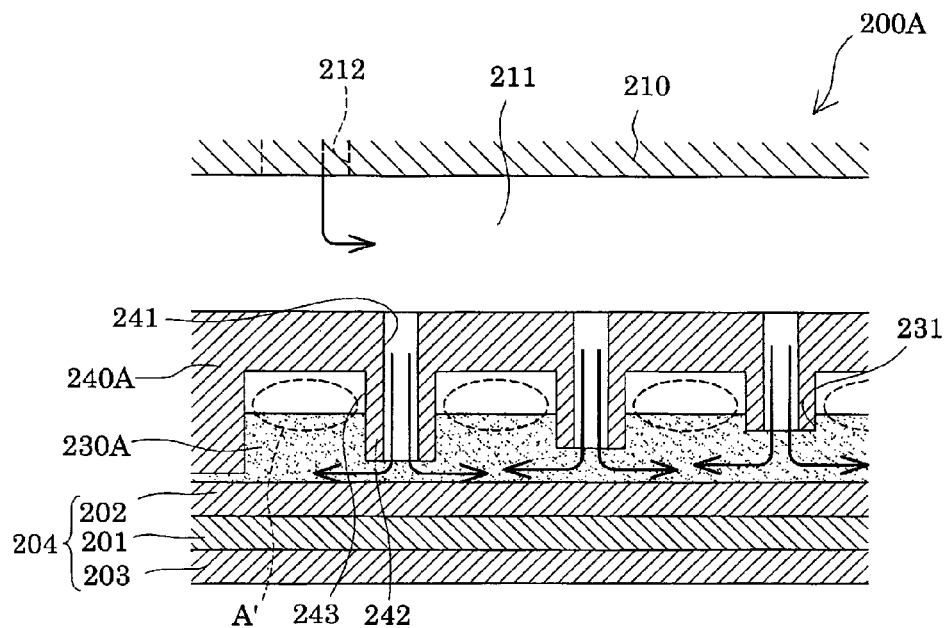
FIG. 11 is a sectional view of essential parts of a fuel cell according to a still further embodiment of the present invention.

As shown in FIG. 10, a guide path 213 serving for communication from the anode fluid introduction port 212 to each anode fluid flow path 241 is provided within the chamber 211. The guide path 213 is configured such that the guide path 213 for communication from the anode fluid introduction port 212 to the anode fluid flow path 241 at a shorter distance therefrom has a smaller width (cross-sectional area) to undergo a larger pressure loss, and the guide path 213 for communication from the anode fluid introduction port 212 to the anode fluid flow path 241 at a longer distance therefrom has a larger width (cross-sectional area) to undergo a smaller pressure loss. That is, when the anode fluid flow path 241 at a short distance from the anode fluid introduction port 212 is taken as the first anode fluid flow path, and the anode fluid flow path 241 at a long distance from the anode fluid introduction port 212 is taken as the second anode fluid flow path, it is advisable that a pressure loss in the first guide path from the anode fluid introduction port 212 to the first anode fluid flow path be rendered greater than a pressure loss in the second guide path from the anode fluid introduction port 212 to the second anode fluid flow path. Because of this configuration, the pressure of the anode fluid supplied from each anode fluid flow path 241 can be uniformized. By this measure, the anode fluid can be supplied uniformly to the surface of the anode catalyst 202 to provide a uniform amount of power generation in the plane of the anode catalyst 202 and increase the power efficiency.

Moreover, if the supply member 240A having the protruding portion 242 of the aforementioned Embodiment 2 is provided, for example, of the plurality of anode fluid flow paths 241, the anode fluid flow path 241 at a shorter distance from the anode fluid introduction port 212 may have a larger amount of protrusion of the protruding portion 242, and the anode fluid flow path 241 at a longer distance from the anode fluid introduction port 212 may have a smaller amount of protrusion of the protruding portion 242. That is, when the protruding portion 242 at a short distance from the anode fluid introduction port 212 is taken as the first protruding portion, and the protruding portion at a long distance from the anode fluid introduction port 212 is taken as the second protruding portion, it is advisable that the amount of protrusion of the first protruding portion be rendered greater than the amount of protrusion of the second protruding portion. In this case, it is advisable that the leading end of the protruding portion 242 be embedded in the gas diffusion layer 230A so that the opening of the anode fluid flow path 241 provided in each protruding portion 242 would contact the gas diffusion layer 230A. By so changing the amount of protrusion of the protruding portion 242, the pressure loss in the anode fluid flow path 241 close to the anode fluid introduction port 212 is increased, while the pressure loss in the anode fluid flow path 241 distant from the anode fluid introduction port 212 is decreased. As a result, the pressure of the anode fluid supplied from each anode fluid flow path 241 can be uniformized, regardless of the distance from the anode fluid introduction portion 212. Consequently, the amount of power generation in the plane of the anode catalyst 202 can be uniformized to increase the power efficiency.

Figure 12:
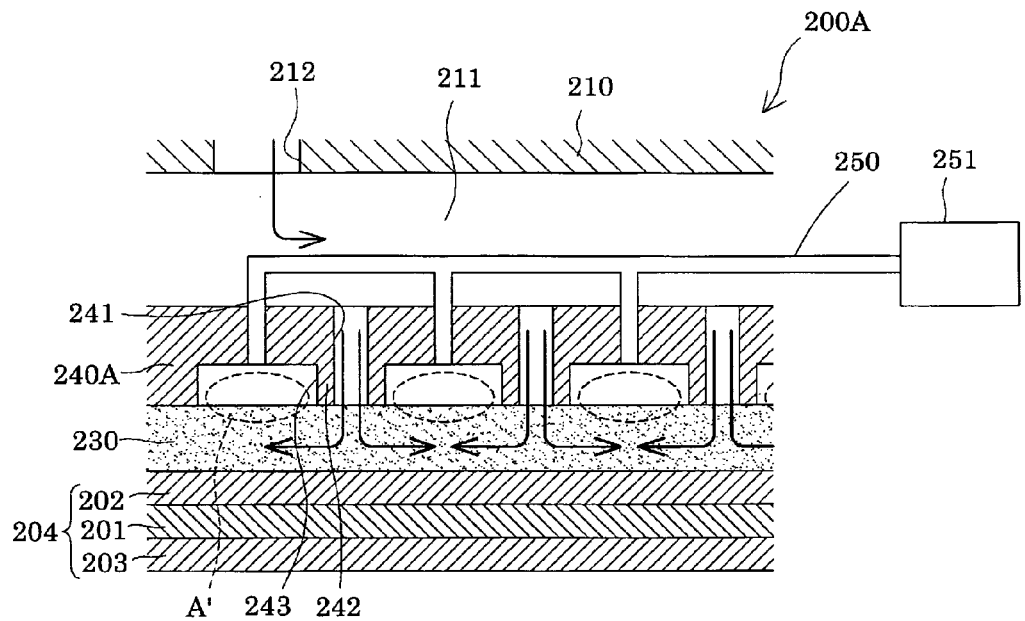
FIG. 12 is a sectional view of essential parts of a fuel cell according to an additional embodiment of the present invention.

Furthermore, in a region where the gas pushed away by the anode fluid flowed out of the anode fluid flow path 241 is stored, a removal means for discharging the gas in this region to the outside may be provided. Such an example is shown in FIG. 12. FIG. 12 is a sectional view of essential parts of a fuel cell showing a modification of the aforementioned Embodiment 2.

As shown in FIG. 12, one end of a lead-out path 250 communicating with the space 243 which is a region for storing the gas pushed away by the anode fluid is connected to the supply member 240A, and the other end of the lead-out path 250 is connected to a storage means 251. The storage means 251 has a space for storing the impure gas, such as nitrogen, from the space 243, and serves as a buffer to discharge to the outside the gas stored in the space 243 connected via the lead-out path 250. A hollow member having a sealed space is named, for example, as the storage means 251. By providing the storage means 251 composed of the hollow member, the pressure inside the storage means 251 becomes comparable to the pressure inside the fuel cell (chamber 211), while the action of the fuel cell is kept at a standstill. When the anode fluid is flowed out of the anode fluid flow path 241, the impure gas pushed away into the space 243 by the flowed-out anode fluid is discharged to the storage means 251, as a buffer, via the lead-out path 250 under the introduction pressure of the anode fluid. Upon discharge of the impure gas in the space 243 to the storage means 251 as the buffer, the pressure inside the space 243 and the pressure inside the storage means 251 equal. When the action of the fuel cell is stopped, the pressure balance between the interior of the space 243 and the interior of the storage means 251 is disturbed, and the impure gas within the storage means 251 returns to the space 243. In this manner, the impure gas in the space 243 is buffer-discharged to the outside of the fuel cell during the action of the fuel cell, whereby the amount of power generation (particularly, initial voltage) can be increased, and power generation can be maintained for a long term.

The hollow member has been named as an example of the storage means 251, but it is not limitative. For example, an adsorbent for adsorbing the gas may be provided within the storage means 251. For example, activated carbon, zeolite or the like can be used as the adsorbent, if it is desired to adsorb nitrogen as the gas.

Figure 13:
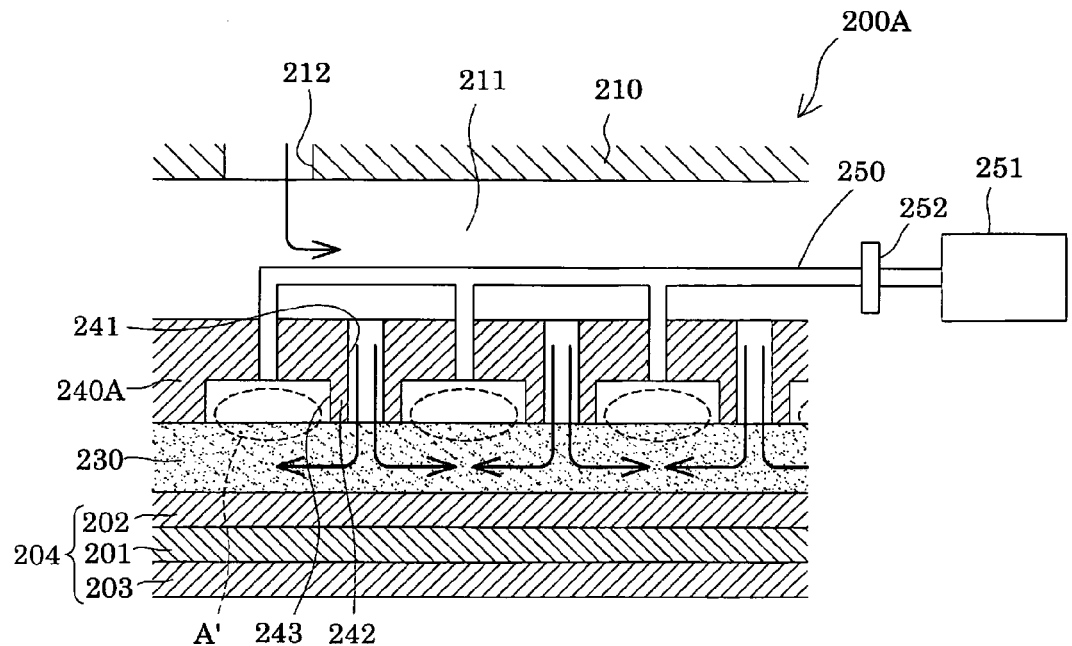
FIG. 13 is a sectional view of essential parts of a fuel cell according to a further additional embodiment of the present invention.

A check valve may be provided in the lead-out path 250 shown in the aforementioned FIG. 12. Such an example is shown in FIG. 13. As shown in FIG. 13, a check valve 252 is provided halfway through the lead-out path 250, namely, between the supply member 240 and the storage means 251. The check valve 252 is mounted in a direction in which it permits the flow of the gas from the space 243, where the gas is stored, to the storage means 251 (buffer), and restrains the flow of the gas in the reverse direction. By providing the lead-out path 250 with the check valve 252 in this manner, the gas stored in the storage means 251 does not flow backward to the space 243 and, even when the action of the fuel cell is stopped, the gas stored in the storage means 251 does not return to the space 243. FIG. 13 shows a modification of the aforementioned Embodiment 2, but this is not limitative. For example, even the configuration of the aforementioned Embodiment 1 without the space 243, or even the configuration shown in any of FIGS. 7 to 11 can exhibit the same effects as above, if provided with removal means for removing the gas in the region where the gas is stored.

Figure 14:
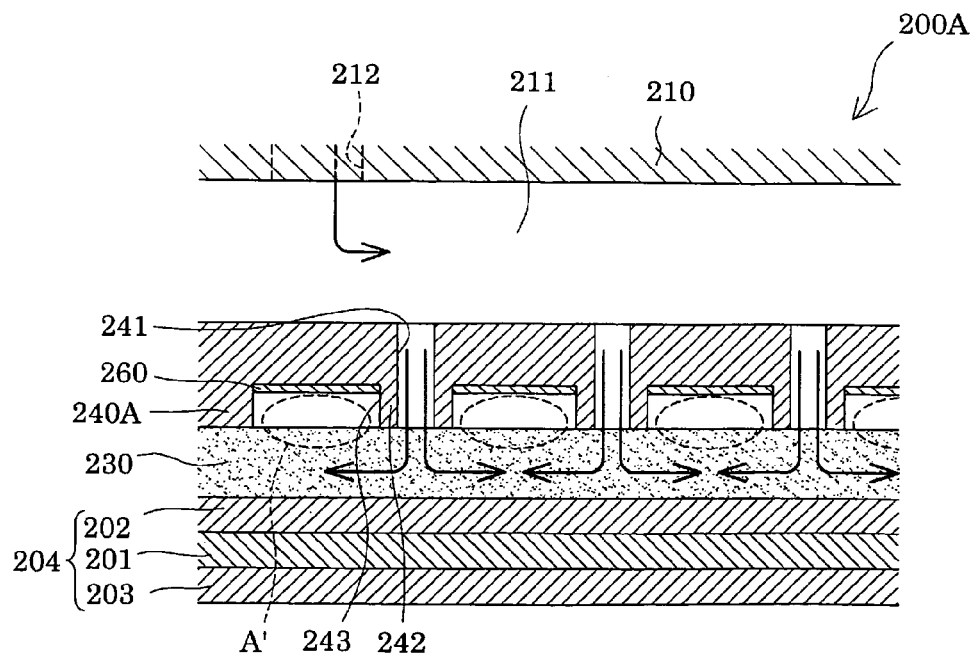
FIG. 14 is a sectional view of essential parts of a fuel cell according to a still further additional embodiment of the present invention.

Further, an adsorbent may be provided in the region where the gas pushed away by the supply of the anode fluid is stored. Such an example is shown in FIG. 14. FIG. 14 is a sectional view of essential parts showing a modification of the aforementioned Embodiment 2.

As shown in FIG. 14, the supply member 240A is provided with an adsorbent 260 in the space 243 which is the region where the gas pushed away by the anode fluid is stored. As the adsorbent 260, activated carbon, zeolite or the like can be used, for example, if it is desired to adsorb nitrogen as the gas. Of course, the adsorbent is not limited thereto, but its material may be determined, as appropriate, depending on the gas whose adsorption is desired.

Even with such a configuration, the gas pushed away to the space 243 is adsorbed to the adsorbent 260, and excess gas within the fuel cell can be removed, so that the amount of power generation (particularly, initial voltage) can be increased, and power generation can be maintained for a long term. Needless to say, the adsorbent 260 may be provided in the aforementioned Embodiment 1.

Any two or more of the configurations shown in the aforementioned configurations of FIGS. 7 to 14 may be combined.

In the above embodiments, the supply member 240, 240A has been provided as a member independent of the anode member 210. However, these members may be configured as a member in which they are provided integrally. Moreover, the supply member 240, 204A may be one in which only the region provided with the anode fluid flow path 241 is a supply member. That is, a member corresponding to any of the supply members 240, 240A of the aforementioned Embodiments 1 and 2 may be composed of a base member comprising a plate-shaped member, and a plurality of supply members fixed to the base member and having anode fluid flow paths individually provided therein.

In the above embodiments, the gas diffusion layer 230 has been provided only on the side of the anode catalyst 202. However, this is not limitative and, for example, a gas diffusion layer 230 comparable to that on the side of the anode catalyst 202 may be provided on the side of the cathode catalyst 203 as well.

The above-described fuel cell 200, 200A can be utilized, for example, as a single cell constituting a cell stack. That is, a cell stack may be formed by stacking a plurality of the above fuel cells 200 or 200A.

Example

The fuel cell of the aforementioned Embodiment 2 shown in FIG. 5 was taken as the fuel cell of the Example.

Comparative Example

A fuel cell, in which the supply member 240 or 240A was not provided, but the gas diffusion layer 230 was directly provided within the chamber 211, was taken as the fuel cell of the Comparative Example.

Test Example

As an initial state, nitrogen was sealed up in the anode of the fuel cell of each of the Example and the Comparative Example to reach 100 kPa (corresponding to the atmospheric pressure). The cathode fluid introduction port 222 was opened to the atmosphere so that air would be naturally supplied into the cathode fluid flow path 221.

Figure 15:
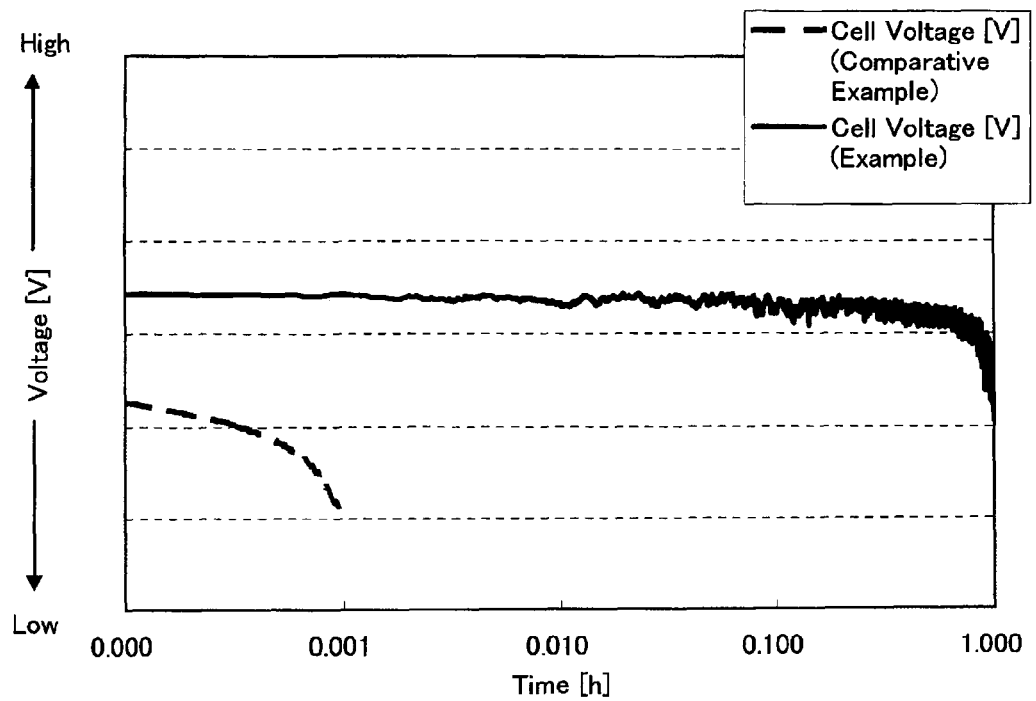
FIG. 15 is a graph showing the results of a test on the present invention.

Then, pure hydrogen at a partial pressure of 30 kPa was supplied through the anode fluid introduction port 212 of each of the Example and the Comparative Example, and an electric current was set at a constant value, to measure the power generation characteristics of each of the Example and the Comparative Example. The results are shown in FIG. 15. In the Test Example, the voltage (h) and the power generation time (h) were measured.

As shown in FIG. 15, the fuel cell of the Example provided an initial voltage about 1.5 times as high as that provided by the fuel cell of the Comparative Example.

Furthermore, the fuel cell of the Example was successful in performing power generation stably and continuously for at least 45 minutes. With the fuel cell of the Comparative Example, on the other hand, power generation stopped in about 4 seconds.

These findings demonstrated that the fuel cell of the Example achieved a performance increase by a factor of 920 or more in the amount of power generation (Wh) over the fuel cell of the Comparative Example.

INDUSTRIAL APPLICABILITY

The present invention can be utilized in the industrial field of fuel cells which uniformize the concentration distribution of the anode fluid in the plane of the surface of the anode catalyst to increase the amount of power generation and continue power generation for a long term.

DESCRIPTION OF THE NUMERALS

A, A' Region
1 Fuel cell system
100 Fuel supply means
200 Fuel cell
201 Solid polymer electrolyte membrane (Electrolyte membrane)
202 Anode catalyst
203 Cathode catalyst
210 Anode member
220 Cathode member
230, 230A Gas diffusion layer
240, 240A Supply member
241 Anode fluid flow path
242 Protruding portion
250 Lead-out path
251 Storage means
252 Check valve
260 Adsorbent
300 Control circuit

The invention claimed is:

1. A fuel cell, comprising:
a membrane electrode assembly comprised of an electrolyte membrane and an anode catalyst;
a supply member for supplying an anode fluid to the membrane electrode assembly, the supply member having a plurality of anode fluid flow paths penetrating the supply member for supplying the anode fluid so as to be directed toward a surface of the membrane electrode assembly, and the supply member having a plurality of protruding portions through which the respective fluid flow paths are formed; and
a gas diffusion layer provided between the supply member and the membrane electrode assembly, an opening of each of the anode fluid flow paths on a discharge side thereof for the anode fluid being disposed in contact with a side of the gas diffusion layer facing the supply member, the protruding portions of the supply member protruding toward the gas diffusion layer with a leading end surface of each of the protruding portions being disposed in contact with the gas diffusion layer, and the supply member including a region that confronts the side of the gas diffusion layer and that stores a gas pushed by the supply of the anode fluid, the region comprising at least one space formed in a portion of the supply member other than portions of the supply member in which the anode fluid flow paths are formed.

2. A fuel cell according to claim 1; wherein the protruding portion has a tapered shape pointed toward the membrane electrode assembly.

3. A fuel cell according to claim 1; wherein each of the anode fluid flow paths has a tapered shape pointed toward the membrane electrode assembly.

4. A fuel cell according to claim 1; wherein the supply member comprises a single supply member to which the plurality of anode fluid flow paths are provided.

5. A fuel cell according to claim 4; further comprising a chamber communicating with the plurality of anode fluid flow paths on a side opposite to the gas diffusion layer, and an anode fluid introduction port for supplying the anode fluid to the chamber; wherein the plurality of anode fluid flow paths comprise a first anode fluid path and a second anode fluid path, a distance from the second anode fluid path to the anode fluid introduction port being longer than a distance from the first anode fluid path to the anode fluid introduction port; and wherein a pressure loss in the first anode fluid flow path is greater than a pressure loss in the second anode fluid flow path.

6. A fuel cell according to claim 5; wherein spacings between adjacent anode fluid flow paths of the plurality of anode fluid flow paths of the supply member gradually decrease from the anode fluid flow paths at shorter distances from the anode fluid introduction port toward the anode fluid flow paths at longer distances from the anode fluid introduction port.

7. A fuel cell according to claim 4; further comprising a chamber communicating with the plurality of anode fluid flow paths on aside opposite to the gas diffusion layer, and an anode fluid introduction port for supplying the anode fluid to the chamber; wherein the plurality of anode fluid flow paths comprise a first anode fluid flow path and a second anode fluid flow path, a distance from the anode fluid introduction port to the second anode fluid flow path being longer than a distance from the anode fluid introduction port to the first anode fluid flow path; and wherein a pressure loss in a first guide path within the chamber in an area from the anode fluid introduction port to the first anode fluid flow path is greater than a pressure loss in a second guide path within the chamber in an area from the anode fluid introduction port to the second anode fluid flow path.

8. A fuel cell according to claim 1; further comprising a chamber and an anode fluid introduction port for supplying the anode fluid to the chamber; wherein the supply member comprises a single supply member to which the plurality of anode fluid flow paths are provided, the plurality of anode fluid flow paths communicating with the chamber on a side opposite to the gas diffusion layer; and wherein the plurality of protruding portions comprises a first protruding portion and a second protruding portion, the second protruding portion being at a longer distance from the anode fluid introduction port than a distance from the anode fluid introduction port to the first protruding portion, and an amount of protrusion of the first protruding portion is larger than an amount of protrusion of the second protruding portion.

9. A fuel cell according to claim 1; further comprising a chamber and an anode fluid introduction port for supplying the anode fluid to the chamber; wherein the plurality of anode fluid flow paths communicate with the chamber on a side opposite to the gas diffusion layer; and wherein a pressure loss in each of the anode fluid flow paths is greater than a pressure loss in an area from the anode fluid introduction port to each of the anode fluid flow paths.

10. A fuel cell according to claim 1; further comprising removal means for removing the gas stored in the region of the gas diffusion layer.

11. A fuel cell according to claim 10; wherein the removal means comprises a lead-out path communicating with the region of the gas diffusion layer that stores the gas and being configured to discharge the gas stored in the region to a buffer.

12. A fuel cell according to claim 11; wherein the lead-out path is provided with a check valve that permits a flow of the gas stored in the region of the gas diffusion layer to the buffer while restraining a flow of the gas in a reverse direction.

13. A fuel cell according to claim 10; wherein the removal means comprises an adsorbent provided in the region of the gas diffusion layer that stores the gas.

14. A fuel cell system comprising:
a fuel cell according to claim 1; and
fuel supply means for supplying the anode fluid to the fuel cell.

15. A fuel cell comprising:
a membrane electrode assembly having an electrolyte membrane and an anode catalyst; and
a supply member for supplying an anode fluid to the membrane electrode assembly, the supply member being positioned relative to the membrane electrode assembly so as to form a space therebetween containing a gas diffusion layer, the supply member having a plurality of anode fluid flow paths each formed as a through-hole penetrating the supply member in a thickness direction thereof for supplying the anode fluid so as to be directed toward a surface of the membrane electrode assembly, each of the anode fluid paths having a discharge opening in direct contact with a surface of the gas diffusion layer so that the anode fluid flowing through the anode fluid flow path and discharged through the discharge opening flows directly into the gas diffusion layer and an impure gas that is pushed by the supply of the anode fluid is stored in a region of the supply member disposed in direct contact with the surface of the gas diffusion layer, thereby preventing the impure gas from being supplied to the anode catalyst of the membrane electrode assembly;
wherein the supply member has a plurality of protruding portions protruding toward the gas diffusion layer and through which the respective through-holes are formed, a leading end surface of each of the protruding portions having the discharge opening; and
wherein the region of the supply member comprises at least one space formed in a portion of the supply member other than portions of the supply member in which the anode fluid flow paths are formed.

16. A fuel cell system comprising:
a fuel cell according to claim 15; and fuel supply means for supplying the anode fluid to the fuel cell.

17. A fuel cell according to claim 1; wherein the plurality of anode fluid flow paths penetrate the supply member along a direction intersecting the surface of the membrane electrode assembly.

18. A fuel cell according to claim 1; wherein the plurality of anode fluid flow paths penetrate the supply member so as to supply the anode fluid from a direction normal to the surface of the membrane electrode assembly.

19. A fuel cell according to claim 1; wherein the region of the supply member that confronts the side of the gas diffusion layer and that stores a gas pushed by the supply of the anode fluid comprises a plurality of regions of the supply member; and wherein the plurality of regions and the plurality of anode fluid flow paths are formed in the supply member so as to be alternately arranged relative to one another.

20. A fuel cell according to claim 19; wherein the through-holes penetrate the supply member so that the supplied anode fluid is directed toward the surface of the membrane electrode assembly to expel an impure gas from a surface of the anode catalyst and the expelled impure gas is stored in the space formed in the supply member by a flow that is formed by the supplied anode fluid and that pushes the impure gas toward the space.

21. A fuel cell according to claim 1; wherein the through-holes penetrate the supply member so that the supplied anode fluid is directed toward the surface of the membrane electrode assembly to expel an impure gas from a surface of the anode catalyst and the expelled impure gas is stored in the space formed in the supply member by a flow that is formed by the supplied anode fluid and that pushes the impure gas toward the space.

22. A fuel cell according to claim 15; wherein the region comprises a plurality of regions of the supply member; and wherein the plurality of regions and the plurality of anode fluid flow paths are formed in the supply member so as to be alternately arranged relative to one another.

23. A fuel cell according to claim 15; wherein the through-holes penetrate the supply member so that the supplied anode fluid is directed toward the surface of the membrane electrode assembly to expel an impure gas from a surface of the anode catalyst and the expelled impure gas is stored in the space formed in the supply member by a flow that is formed by the supplied anode fluid and that pushes the impure gas toward the space.

* * * * *